XR 3,836,348

United States Patent [19]
Sumimoto et al.

[11] 3,836,348
[45] Sept. 17, 1974

[54] METHOD FOR MANUFACTURING OPTICAL INTEGRATED CIRCUITS UTILIZING AN EXTERNAL ELECTRIC FIELD

[75] Inventors: Toru Sumimoto; Shigeo Matsushita; Tadafumi Fujiwara, all of Tokyo; Ken Koizumi; Tetsuya Yamazaki, both of Hyogo, all of Japan

[73] Assignee: Nippon Selfoc Company, Limited, Tokyo, Japan

[22] Filed: Feb. 22, 1973

[21] Appl. No.: 334,593

[52] U.S. Cl. .......... 65/30, 204/130
[51] Int. Cl. .......... C03c 21/00
[58] Field of Search .......... 204/130; 65/30

[56] References Cited

UNITED STATES PATENTS

| | | | |
|---|---|---|---|
| 3,486,808 | 12/1969 | Hamblen | 65/30 |
| 3,687,649 | 8/1970 | Bourgeaux | 65/30 |

OTHER PUBLICATIONS

"Refractive Index Changes Produced in Glass by Son Exchange" by French et al., Ceramic Bulletin, Vol. 49, No. 11, 1970, pp. 974–977.

*Primary Examiner*—John H. Mack
*Assistant Examiner*—R. L. Andrews
*Attorney, Agent, or Firm*—John M. Calimafde

[57] ABSTRACT

A method for manufacturing optical integrated circuits forms light guide paths in a substrate by an ionic exchange process. Ions initially present in the substrate are replaced by ions from a source thereof to locally increase the substrate index of refraction, thereby forming light guides, in a pattern dependent upon a mask disposed intermediate the substrate and the ion source.

An electric field is externally applied in the direction of ionic migration to provide light guide walls exhibiting abrupt variations in refractive index.

In accordance with one aspect of the present invention, a light guide may be shifted into the interior of the substrate.

7 Claims, 7 Drawing Figures

Figure 1:
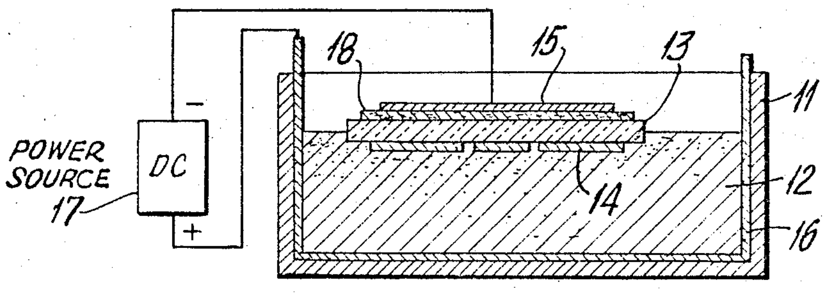

3836348
OR IN 65/30R

PATENTED SEP 17 1974 3,836,348

METHOD FOR MANUFACTURING OPTICAL INTEGRATED CIRCUITS UTILIZING AN EXTERNAL ELECTRIC FIELD

DESCRIPTION OF THE INVENTION

This invention relates to semiconductor fabrication and, more specifically, to a method for manufacturing an optical integrated circuit, utilizing an electric field effect to form a light wave guide within a relatively short time and with improved light conducting properties.

In recent years, the field of optoelectronics has been greatly developed. It has become a matter of concern to those practicing in this art to fabricate optical integrated circuits which correspond to electronic integrated circuits. In The Bell System Technical Journal, September 1969, S. E. Miller suggests an optical integrated circuit and fundamental techniques which may be employed for the manufacture thereof. However, no concrete manufacturing method is described.

Specific fabricating methods which may be considered for supplementing the suggestion of the fundamental techniques disclosed in the article include high-frequency sputtering, ion irradiation, ion exchange processes, and so forth. High-frequency sputtering is a method in which a substance to construct a light guide is sputter-evaporated on a substrate. It is difficult to uniformly and densely couple atoms of the substance when the light wave guide line is formed by sputtering, so that light is likely to be scattered. In addition, light tends to disperse due to the adverse affect of non-uniformity at the boundary surface between the substrate and the substance, so that transmission losses become very large. Further, when the substance is a dielectric, the sputtering rate is very low, so that the number of operations required for manufacture becomes enormous.

The ion irradiation process is a method in which a substance to constitute a light guide is forcibly implanted into a dielectric substrate. In order to form the light guide, the refractive index thereof is made higher than that of the host substrate by at least 0.001 and, to this end, heavy atoms must be implanted in large quantities. The implantation is therefore technically very difficult. Even if this difficulty is solved, distortion appearing within the substrate may induce minute damage in the light guide and, hence, the optical stability of the light guide is rendered insufficient.

With an ion exchange process, the imperfections of the inner part and boundary surface of the light guide, the imperfections being the problem of the high-frequency sputtering process, can be eliminated substantially completely, and the technical difficulty as well as the optical instability in the ion injection process can be readily overcome. The ion exchange process therefore makes it extremely easy to form a light guide which is optically stable, and low in loss. Moreover, since this procedure can simultaneously process a number of substrates, it reduces working steps. Thus, the ion exchange process is an excellent method of manufacture.

In order to form a desired light guide by the ion exchange process, the following method is usually employed. A mask for preventing ion exchange, having a pattern with the profile of the light wave guide line inverted to a negative, is provided on a substrate in close contact therewith. The substrate is then held in contact with an ion source for ion exchange. Thus, ions susceptible to thermal diffusion near the surface of the substrate corresponding to the light wave guide line are ion-exchanged with (i.e., replaced by) ions susceptible to thermal diffusion contained in the ion source. In this manner, a refractive index distribution satisfying the light propagating conditions of the light guide is created in the vicinity of the substrate surface by selecting the type of ions for the ion exchange and the temperature and time of the exchange action.

In the above method, optical glass containing comparatively large quantities of alkali metal ions, such as ions of sodium, potassium, and the like, which contribute little to the refractive index, is employed for the substrate. A molten salt containing monovalent ions, such as ions of Tl, Cs and the like, exhibiting a large electronic polarizability and, accordingly, effecting a large contribution to refractive index, is used for the ion source for the ion exchange. A thin metal film hindering ionic diffusion is employed for the mask.

The treatment time of the foregoing ion exchange is determined by the diffusion rate of the ions in the substrate. Accordingly, even if the treatment temperature is raised to an extent below the softening deformation of the substrate, that is, to a temperature of 450° C to 500° C, the substrate must be held in the molten salt for the relatively long time of one to three hours in order to perform the ion exchange operation over the depth of 5 to 10 microns required for the light wave guide line. Such long-time treatment is inefficient and undesirable from a production standpoint.

In addition, the above process is disadvantageous in that the metal mask may be eroded by physical and chemical interaction with the molten salt during treatment, to cause pin holes or exfoliation from the substrate, resulting in deteriorated optical performance of the light guide to be formed. Moreover, the shape of the refractive index distribution formed by the ion exchange treatment is of the thermal diffusion distribution type determined by the conditions of the compositions of the substrate and the molten salt, the treatment temperature and the treatment time. It is difficult to control the distribution to be one of rectangular section to provide a light guide which is high in degree of integration and which is of easy optical coupling. More specifically, with the prior-art method, the refractive index gradient at the peripheral part of the light wave guide line is gradual and relatively small and, therefore, the field distribution of propagating light spreads outward. Accordingly, when it is intended to avoid the undesired interference between light beams passing through adjacent light wave guide lines, the degree of integration per unit area cannot be made very high.

The single mode operating condition which is a basic condition, especially for use of an optical integrated circuit for communication equipment or applications, is given in a paper by Marcatili entitled "Dielectric Rectangular Waveguide and Directional Coupler for Integrated Optics," published in The Bell System Technical Journal, Vol. 48, No. 7, pp. 2,071– 2,102, by the following equation, wherein $n_1$ is the refractive index of the light wave guide line, $n_4$ is the refractive index of the surrounding substance, and $b$ is the width of the light wave guide line:

$$(2\, b/\lambda)\ \sqrt{(n_1 + n_4)\, \Delta n} < \text{const.} \quad 1.$$

where $\Delta n = n_1 - n_4$.

As is apparent from Eq. (1), $\Delta n$ or $b$ may be made small in order to attain single mode operation. The operative condition bears a square root dependency on $\Delta n$, whereas it depends on the width $b$ linearly, so that reduction of the width $b$ is more effective.

With the prior-art method, however, the refractive index distribution becomes of the thermal diffusion type as has been previously stated and, hence, $\Delta n$ tends to be comparatively small, while the width of the distribution $b$ is large. It has accordingly been very difficult to achieve single mode operation by the prior-art method.

Further, when fabricating an optical coupler or a filter, the light guides cannot be brought into sufficient physical proximity on account of the thermal diffusion type distribution, to render the coupling length large. It has therefore been impossible to make the degree of integration per unit volume very high.

It is thus an object of the present invention to provide a practical method for manufacturing an optical integrated circuit.

More specifically, it is an object of the present invention to provide a method for manufacturing optical integrated circuits which is free from the disadvantages of the foregoing ion exchange method, according to which an electric field is utilized to effectively act on a substrate to make the migration of ions rapid, thereby enhancing production efficiency and preventing a metal mask from being deteriorated. Further, the strength of the electric field is controlled, thereby producing light wave guide lines of a high degree of integration; of easy optical coupling; permitting ready control of single mode operation; and having a refractive index distribution very close to a rectangular distribution in which the refractive index varies abruptly at the peripheral part of the light guide.

Figure 2A:
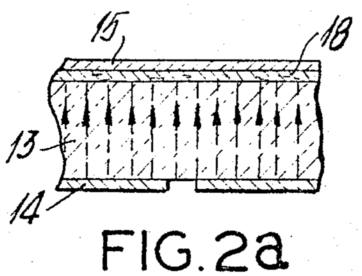
Figure 2B:
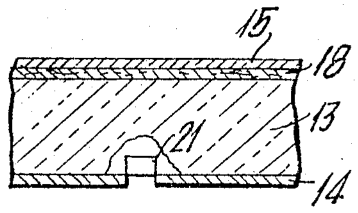
Figure 3:
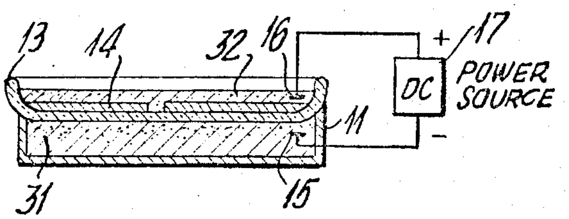
Figure 4A:
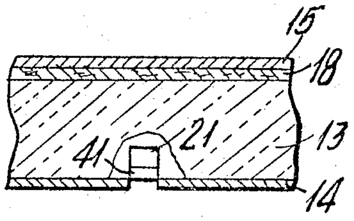
Figure 4B:
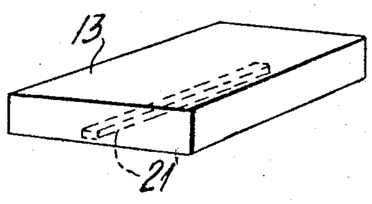
Figure 5:
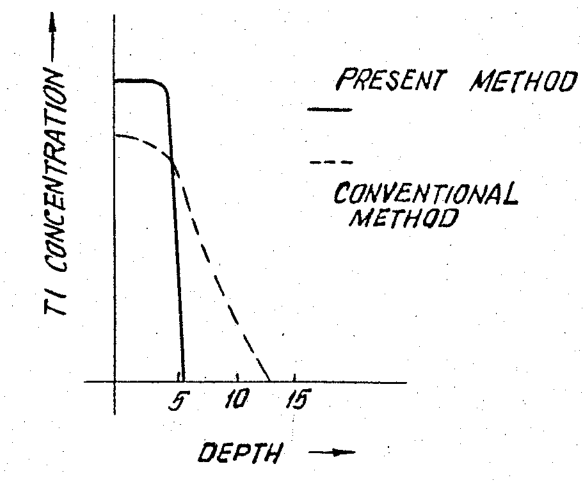

The above-described objects and features of the present invention will become more clear from the following detailed discussion of specific illustrative embodiments thereof, considered below in conjunction with the accompanying drawings, in which:

FIG. 1 comprises a cross-sectional view of apparatus illustrating practice of the present invention;

FIGS. 2(*a*) and 2(*b*) are expanded cross-sectional views of a substrate 13 of FIG. 1 and related apparatus, in the practice of the present invention;

FIG. 3 schematically depicts in cross-section alternative apparatus for the practice of the present invention;

FIGS. 4(*a*) and 4(*b*) depict methodology of the present invention wherein an optical guide is formed in the interior of a substrate; and FIG. 5 graphically illustrates the ionic distribution profile along the cross-section of a substrate in accordance with the method of the present invention (solid line) and a prior art method (dashed line).

Referring now to FIG. 1, there is shown equipment for forming a light guide in the vicinity of the surface of a substrate by applying an electric field to the substrate. A container 11 receives a molten salt 12 which serves as an ion source. The salt 12 may comprise a sulfate or nitrate containing at least one kind of ions, such as ions of Tl and Cs, which contribute much more to the refractive index than monovalent ions in a dielectric substrate 13. The light wave guide line is formed in the surface of the substrate 13, which may comprise an optical glass plate containing at least one kind of ions, such as ions of potassium or sodium, which contribute less to the refractive index substrate property than the ions in the ion source. A mask 14 with a required pattern is provided in close contact with the substrate in order to develop the light wave guide line near the surface of the substrate 13. The mask 14 may be made of one or more of a metal, a metal oxide and a dielectric substance for preventing ionic migration, and which has a pattern with the profile of the light guide inverted into a negative.

Electrodes 15 and 16 establish an electric field within the substrate 13, the electrode 15 being maintained at a negative potential, and the electrode 16 at a positive one. A DC power source 17 generates the electric field within the substrate 13. A material 18 accepts the ions migrating from the substrate 13, and may be formed, by way of example, of clay containing a nitrate or sulfate.

FIG. 2 shows the parts 13, 14, 15 and 18 in FIG. 1 on an enlarged scale. When electric power is supplied to the equipment arranged and connected as in FIG. 1, an electric field distribution represented by dashed arrows in FIG. 2(*a*) occurs within the substrate 13, and the monovalent ions in the molten salt, which contribute substantially to the refractive index, intrude from an unmasked or exposed mask part into the interior of the substrate 13 along the electric field gradient. As a result, as shown in FIG. 2(*b*), a portion 21 characterized by a refractive index higher than that of the substrate is created in the vicinity of the undersurface of the substrate 13, to form the light guide. In the light guide thus obtained, changes of refractive index at sides perpendicular to the surface of the substrate are abrupt because of the uniform electric field distribution. The refractive index changes at the guide surface parallel to the substrate surface are also abrupt, since the applied field has a sufficiently larger intensity such that the ionic migration proceeds at a speed higher than the natural diffusion rate of the ions. Thus, the refractive index distribution of the section of the light guide becomes the desired rectangular one as previously stated.

The foregoing method, which is the fundamental embodiment of the present invention, will be further illustrated by a specific example thereof.

EXAMPLE: A 3-mm thick optical glass plate was prepared having a composition consisting of 72 percent by weight of $SiO_2$, 12 percent of $Na_2O$, 2 percent of $K_2O$, 8 percent of CaO, 4 percent of MgO and 2 percent of $Al_2O_3$. A metal mask for preventing ionic migration was formed with a pattern with the contour of a desired light guide inverted into a negative. The mask bore a channel 50 microns in width, 12 cm in length, and 0.1 microns in thickness formed on one surface of the optical glass plate by evaporation employing a sputtering process.

A material was prepared such that $KNO_3$ and clay were mixed in equal weight proportions. The mixture was pulverized to become a fine powder having an average particle size of about 1 micron, and water was thereafter added to convert the powder into a pasty state. The composite paste material was applied on the other surface of the glass plate to a thickness of approximately 1 mm and was dried.

The glass substrate was caused to float in a molten salt with the masked surface facing down, the molten salt containing $Tl_2SO_4$ and $ZnSO_4$ at a ratio of equal mols.

Electrode plates of metal Ti were placed in the molten salt and on the surface applied with the paste. With the temperature of the molten salt held at 450° C, a direct current at a voltage of 50 V was caused to flow for 1 minute while the electrode plate in the molten salt was maintained at a positive potential and that on the paste-applied surface at a negative potential. The current permitted to flow was 200 microamperes. As a result, Tl ions in the molten salt intrude through the channel of the mask into the surface layer of the glass plate. On the other surface, potassium and sodium ions migrated from the glass plate into the applied paste. After removing the mask, laser light was employed to irradiate the resulting structure. The three lower-order modes could be propagated.

FIG. 5 shows a Tl-concentration distribution obtained by an X-ray microanalyzer in a solid line curve. This confirmed that a light wave guide line 50 microns wide and 5 microns deep, having a refractive index 0.02 higher than that of the surrounding glass was formed in the surface layer of the glass. A dashed line to FIG. 5 shows the Tl concentration profile resulting when, using the same glass plate and molten salt mentioned above, the processing was carried out at 500° C for 2.5 hours in accordance with the prior-art method. When both the results are compared, it is apparent that the period of time required for ion exchange can be made as short as several hundredths of that required for the prior-art method when the electric field method of the present invention is utilized, and that the refractive index distribution achieved by the electric field method is an ideal rectangular one in which the refractive index radically varies about the periphery thereof.

A variety of manufacturing methods can be further provided by applying combinations of the fundamental steps of the present invention as have been described in detail in conjunction with FIGS. 1 and 2 and the example. While the application of the pasty material consisting of clay containing a nitrate or sulfate on the glass substrate has been employed in the above-described process, the material may be replaced with a molten salt 31, as depicted in FIG. 3. The molten salt 31 receives ions migrating from the substrate 13, while a molten salt 32 contains ions which locally increase the substrate refractive index. In order that the molten salt may be held in place, the substrate 13 is formed in a container-like shape. The electrode 15 in the molten salt 31 is maintained at a negative potential and the electrode 16 in the molten salt 32 at the upper part at a positive potential via a DC voltage source 17 connected to the electrodes. The ions which contribute relatively more to the refractive index, for example, Cs ions, migrate to the surface layer of the substrate 13 through a channel of the mask 14 which selectively inhibits ionic migration. A light wave guide line higher in the refractive index than the substrate is formed at the substrate location corresponding to the mask channel.

It is also possible to form a light guide in the interior of the substrate. The substrate in FIG. 2(*b*) as produced by the use of the foregoing fundamental methodology (including the guide 21 of high refractive index) is set in equipment similar to that in FIG. 1, but differing only in that the molten salt 12 is replaced by a molten salt containing ions which contribute less to the substrate refractive index, for example, sodium and potassium ions. A DC voltage is applied across the structure in FIG. 2(*b*) as before. As shown in FIG. 4(*a*), the portion 21 of higher refractive index formerly at the substrate surface moves to a deeper part of substrate 13, while a portion 41 is formed with a refractive index substantially equal to that of the substrate 13. As a result, the light guide 21 is formed in the interior of the substrate 13 as is illustrated in FIG. 4(*b*). With this light guide, light is propagated without being totally reflected by the substrate surface. Therefore, influences by minute defects remaining in the substrate surface can be eliminated, to make the optical characteristics of the light guide still better.

In the foregoing embodiments, a molten salt is used as the ion source. However, the desired ion exchange can be effected when a thin film is employed as an ion source, the thin film being produced such that an alloy, for example, consisting of Tl and Ca and ranging in Ca content from 20 percent to 60 percent is evaporated or sputtered onto the substrate from above the mask having a pattern inverted to a negative. Therefore, the ion source is not restricted to a molten salt.

Also, while the shape of the substrate 13 has been described above as being flat, it may assume any desired configuration.

The above described processes are merely illustrative of the principles of the present invention. Numerous modifications and adaptations thereof will be readily apparent to those skilled in the art without departing from the spirit and scope of the present invention.

What is claimed is:

1. A method for manufacturing an optical integrated circuit wherein a light guide of a desired pattern and of relatively large refractive index is formed in a glass substrate, utilizing an electric field, characterized by providing a mask for selectively preventing ionic migration on one surface of the glass substrate in close contact therewith, said mask having a pattern with the profile of a desired light guide inverted to a negative thereof, said glass substrate containing therein a first kind of ions; maintaining an ion source of a second kind of ions in contact with said one surface of said glass substrate, said second kind of ions having a greater degree of contribution to the substrate refractive index than the degree of contribution of said first kind of ions, said second kind of ions being capable of undergoing an ion exchange procedure with said first kind of ions; maintaining an electrically conductive substance capable of accepting said first kind of ions into the interior thereof in contact with the other surface of said glass substrate; and externally applying a voltage between said ion source and said electrically conductive substance with said ion source as an anode, whereby said second kind of ions in said ion source move under electric field acceleration from the glass substrate surface in contact therewith towards the interior of said glass substrate along the direction of an electric field produced by the applied voltage, and said first kind of ions formerly contained in said glass substrate move under electric field acceleration towards said electrically conductive substance along the direction of said electric field, said first kind of ions at that part of the layer of said one surface of said glass substrate which corresponds to said light passage undergoing ion exchange with said second kind of ions to form said light guide of the desired pattern and of relatively large refractive index in said one surface of said glass substrate, the refractive index in the vicinity of a boundary between said light guide and the interior of said glass substrate varying abruptly in directions traversing said boundary.

2. The method for forming a light guide in a substrate by an ion exchange process in the fabrication of an optical integrated circuit, ions initially present in the substrate being replaced by ions from an ion source which locally increases the substrate index of refraction to form said light guide, a mask being employed intermediate said ion source and said substrate to selectively locally permit ion migration from said ion source to said substrate, the improvement comprising externally applying an electric field along the direction of ion migration from said ion source to said substrate to thereby provide a relatively large refractive index gradient for the light guide at the boundaries thereof.

3. A method as in claim 2, further comprising disposing said substrate with a formed light guide contiguous to an ionic source for supplying ions contributing relatively little to the substrate index of refraction, a mask being disposed intermediate said ionic source and said substrate, and applying an external electric field to move said light guide to the interior of said substrate.

4. A method as in claim 2, wherein said electric field applying step comprises disposing electrodes on either side of said substrate, and applying a source of electric potential therebetween.

5. A method as in claim 2, further comprising the step of disposing ion accepting means on said substrate remote from said mask to accept ions migrating from said substrate under electric field acceleration.

6. A method as in claim 2, wherein said ion source comprises a molten salt.

7. A method as in claim 2, wherein said ion source comprises a thin film.

* * * * *

UNITED STATES PATENT OFFICE
CERTIFICATE OF CORRECTION

Patent No. 3,836,348 Dated October 8, 1974

Inventor(s) Toru Sumimoto et al

It is certified that error appears in the above-identified patent and that said Letters Patent are hereby corrected as shown below:

In the caption, Foreign Application Priority Data should be indicated as follows:

--February 28, 1972 Japan...............47/20913--

Signed and sealed this 29th day of April 1975.

(SEAL)
Attest:

RUTH C. MASON
Attesting Officer

C. MARSHALL DANN
Commissioner of Patents
and Trademarks

ORM PO-1050 (10-69)